US008982149B2

(12) United States Patent
D'Ambrosio et al.

(10) Patent No.: US 8,982,149 B2
(45) Date of Patent: Mar. 17, 2015

(54) GENERATING FLOWER IMAGES AND SHAPES WITH COMPOSITIONAL PATTERN PRODUCING NETWORKS

(71) Applicant: University of Central Florida Research Foundation, Inc., Orlando, FL (US)

(72) Inventors: David D'Ambrosio, Orlando, FL (US); Sebastian Risi, Orlando, FL (US); Joel Lehman, Orlando, FL (US); Amy K. Hoover, Orlando, FL (US); Kenneth O. Stanley, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 178 days.

(21) Appl. No.: 13/631,393

(22) Filed: Sep. 28, 2012

(65) Prior Publication Data

US 2013/0083016 A1 Apr. 4, 2013

Related U.S. Application Data

(60) Provisional application No. 61/541,967, filed on Sep. 30, 2011.

(51) Int. Cl.

*G09G 5/00* (2006.01)
*G06E 1/00* (2006.01)
*G06E 3/00* (2006.01)
*G06T 11/20* (2006.01)
*G06T 15/00* (2011.01)

(52) U.S. Cl.

CPC ............... *G06T 11/206* (2013.01); *G06T 15/00* (2013.01)
USPC ............................................ 345/619; 706/16

(58) Field of Classification Search

USPC ......................................................... 345/619
See application file for complete search history.

(56) References Cited

U.S. PATENT DOCUMENTS 8,504,500 B2 * 8/2013 Hartmann et al. .............. 706/16

OTHER PUBLICATIONS

Bornhofen, Stefan, et al., "Evolving CSR Strategies i nVirtual Plant Communities,", In Artificial Life XI: Proceedings of the Eleventh International Conference on the Simulation and Synthesis of Living Systems (2008), pp. 72-79.

Darner, Bruce, et al., "Nerve Garden: A Public Terrarium in Cyberspace," In Virtual Worlds, Lecrture NOtes in Computer Science, pp. 177-185 (1998).

Secretan, Jimmy, et al., "Picbreader: A case Study in Collaborative Evolutionary Exploration of Design Space," Manuscript to appear in Evolutionary Computation Journal, MIT Press, 2011 (33 Pages).

Secretan, Jimmy, et al., "Picbreeder: Evolving Pictures Collaboratively Online," In Proceedings of the Computer Human Interaction Conference (CHI 2008). New York, NY: ACM, 2008 (10 Pages).

Stanley, Kenneth O., "Compositional Pattern Producing Networks: A Novel Abstraction of Development," In: Genetic Programming and Evolvable Machines Special Issue on Developmental Systems 8(2): 131-162, New York, NY: Springer, 2007 (36 Pages).

* cited by examiner

*Primary Examiner* — M Good Johnson
(74) *Attorney, Agent, or Firm* — Thomas | Horstemeyer, LLP

(57) ABSTRACT

Various embodiments are disclosed for generating an image from a Compositional Pattern Producing Network (CPPN). One such method includes receiving, in the CPPN, a series of polar coordinates $\{r,\theta\}$; outputting, by the CPPN, a series of pixel values, each of the pixel values corresponding to one of the polar coordinates; and displaying the pixel values at the corresponding polar coordinates to produce the image.

20 Claims, 6 Drawing Sheets

400

L=.5
θ
r
L=1.0

GENERATING FLOWER IMAGES AND SHAPES WITH COMPOSITIONAL PATTERN PRODUCING NETWORKS

CROSS REFERENCE TO RELATED APPLICATIONS

This application claims the benefit of U.S. Provisional Application No. 61/541,967, entitled "Generating Flower Images And Shapes With Compositional Pattern Producing Networks," filed Sep. 30, 2011, which is hereby incorporated by reference in its entirety.

BACKGROUND

Computer-implemented Artificial Neural Networks (ANNs) have a wide variety of applications, including decision making, pattern recognition, sequence recognition, and data mining. A specific type of ANN known as a Compositional Pattern Producing Network (CPPN) can be used to produce images.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to techniques for generating digital images, and more specifically, for generating digital images of structures having a radially repetitive arrangement of petals. A flower is one example of such a structure. Compositional Pattern Producing Networks (CPPNs) are used to encode or represent the images of these structures, with enhancements specifically designed to produce aesthetically pleasing images of structures having arbitrary complexity. The encodings described herein are not parameterized, and thus do not require all possible ways of variation to be specified a priori by the designer. Some of the encodings described herein generate shapes that are connected, which can facilitate three-dimensional creation of flower objects rather than two-dimensional flower images.

The embodiments described herein use various specializations and/or extensions of CPPNs to represent a specific class of images that include radially-arranged petals, giving the image a flower-like appearance. To achieve the radial arrangement, a specialization used by some embodiments is to use a radial (polar) coordinate frame instead of a Cartesian coordinate frame. In such embodiments, the inputs to the CPPN are polar coordinates $\{r,\theta\}$ rather than Cartesian coordinates $\{x,y\}$. Because flowers are generally radially repetitive, a specialization used by some embodiments is to transform the angular input coordinate $\{\theta\}$ by a periodic transform P. Trigonometric functions are one example of such period transforms. In one embodiment, the periodic transform is a sine wave with a periodicity proportional to a desired number of petals. The CPPN is thereby constrained to generate radially repetitive images, which in turn constrains the image space to be more petal-like. The angular input coordinate $\{\theta\}$ may be transformed by other types of functions as should be appreciated.

Figure 1:
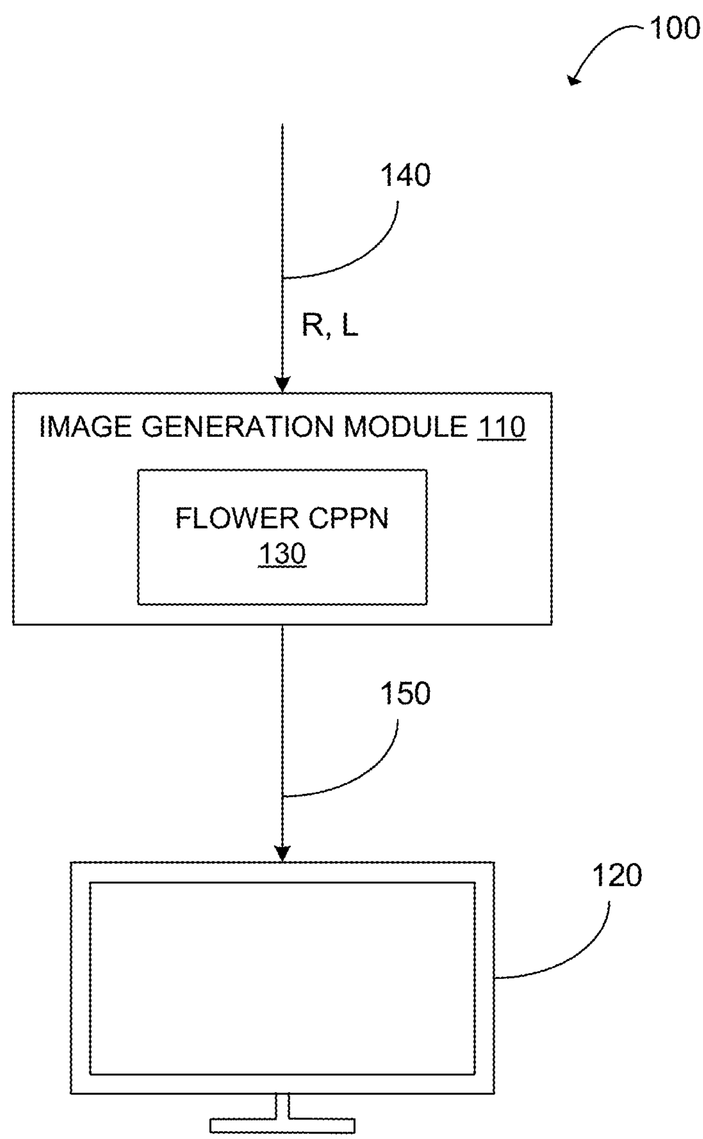
FIG. 1 is a diagram illustrating a computer system that generates digital images of structures having a radially repetitive arrangement of petals, according to some embodiments disclosed herein.

FIG. 1 is a block diagram of a computer system that generates digital images of structures having a radially repetitive arrangement of petals, according to some embodiments disclosed herein. System 100 includes an image generation module 110 and an output device 120. The output device 120 can take various forms, for example, a display or monitor, a printer, or a three-dimensional materials printer. The image generation module 110 includes a flower CPPN 130. The flower CPPN 130 encodes and stores an image having a radially repetitive arrangement of petals, for example, a flower image.

The image generation module 110 receives, as input, a petal arrangement description 140. The petal arrangement description 140 includes a maximum radius R which controls the arrangement of petals in the generated image. In some embodiments, the petal arrangement description 140 also includes a number of layers L. Various mechanisms may be used to input the petal arrangement description 140 into the system 100. For example, the system 100 may store descriptions in the form of configuration files, or may provide a user interface by which users input the petal arrangement description 140.

The image generation module 110 extracts parameters R and (optionally) L from the petal arrangement description 140, and provides R and (optionally) L to the flower CPPN 130, along with a series of polar coordinates defining a circle. For each of the polar coordinates $\{r,\theta\}$, the flower CPPN 130 outputs a corresponding pixel value 150. These pixel values 150 are supplied to the output device 120. In this manner, the system 100 generates an image having a radially repetitive arrangement of petals.

Figure 2:
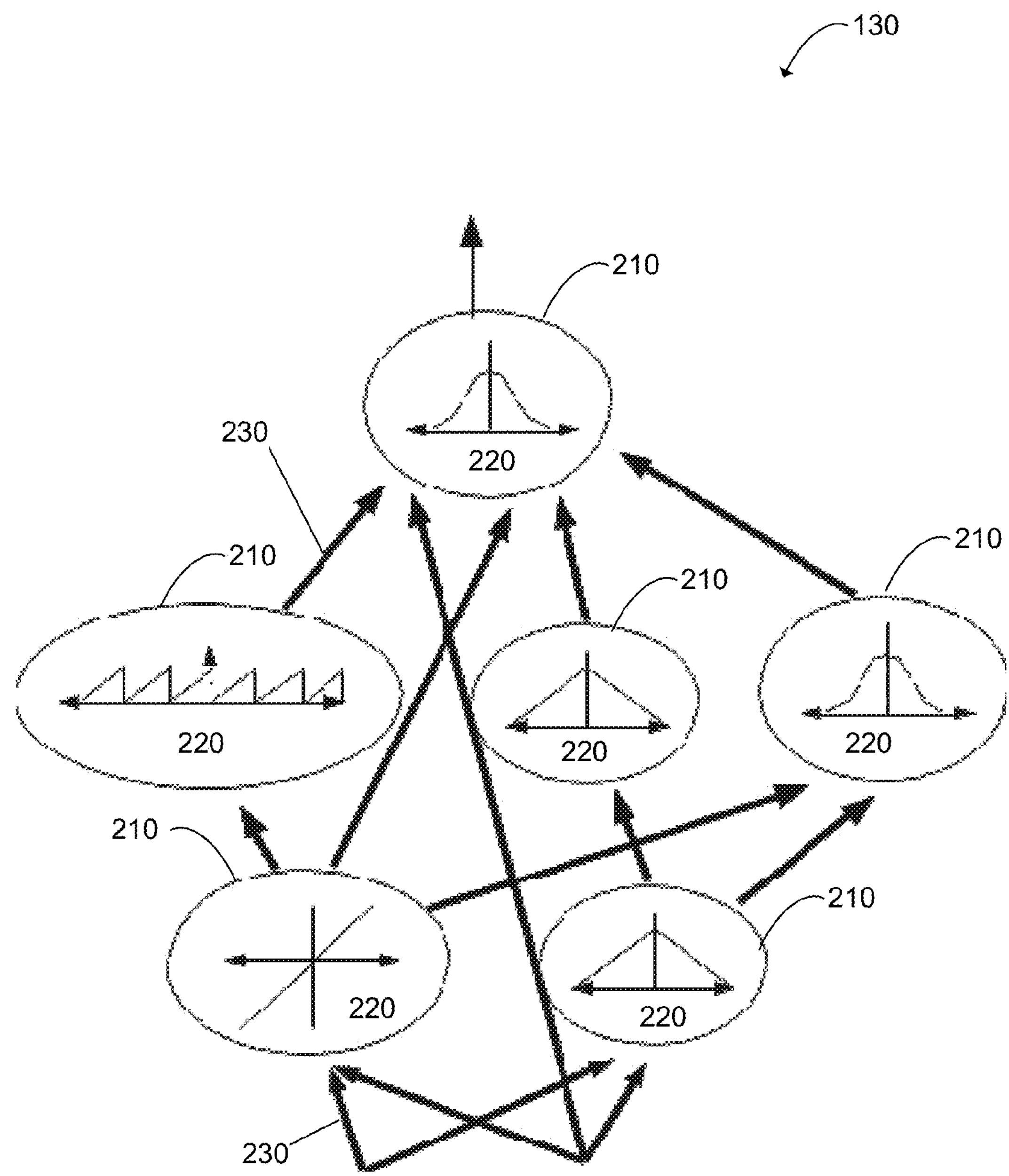
FIG. 2 is a block diagram of a flower CPPN from FIG. 1, according to some embodiments disclosed herein.

FIG. 2 is a block diagram of a flower CPPN 130 (FIG. 1), according to some embodiments disclosed herein. The flower CPPN 130 is constructed as a network of connected nodes 210, where an activation function 220 is associated with each node 210.

The flower CPPN 130 may thus be defined as a connected graph (i.e., a network) of activation functions 220 chosen from a canonical set. The activation functions 220 can take the form of sigmoid functions, Gaussian functions, many others. The activation functions 220 used for the canonical set of a particular flower CPPN 130 creates a bias in that flower CPPN 130 toward specific types of patterns and regularities. Thus, the designer of the system 100 can bias the types of patterns it generates by selecting the set of canonical functions that define the flower CPPN 130. Various mechanisms may be used to input CPPN definitions into the system 100. For example, the system 100 may store definitions in the form of configuration files, or may provide a user interface by which users input CPPN definitions.

The structure of the graph defining the flower CPPN 130 represents how the functions are composed to process each input coordinate. The connections 230 between nodes 210 are weighted such that the output of a function is multiplied by the weight of its outgoing connection. If multiple connections 230 feed into the same node 210 then the downstream function takes the sum of their weighted outputs.

The flower CPPN 130 can be viewed as a function of n Cartesian dimensions that outputs a pattern in space, and thus represents or encodes an image as a function queried over a coordinate frame. A two-dimensional image can be represented as F(x,y), where F, a composition of simple functions, is sampled over a grid of x,y Cartesian coordinates. The value of the function F(x,y) is interpreted as a gray-scale or color pixel value plotted at x,y. Thus, the image represented by the flower CPPN 130 may be generated by querying the nodes of the flower CPPN 130 and drawing a pixel each of the coordinates having an intensity corresponding to the output of f. In effect, the flower CPPN 130 defines a two-dimensional surface where the output for each point on the surface is interpreted as a pixel value.

Figure 3:
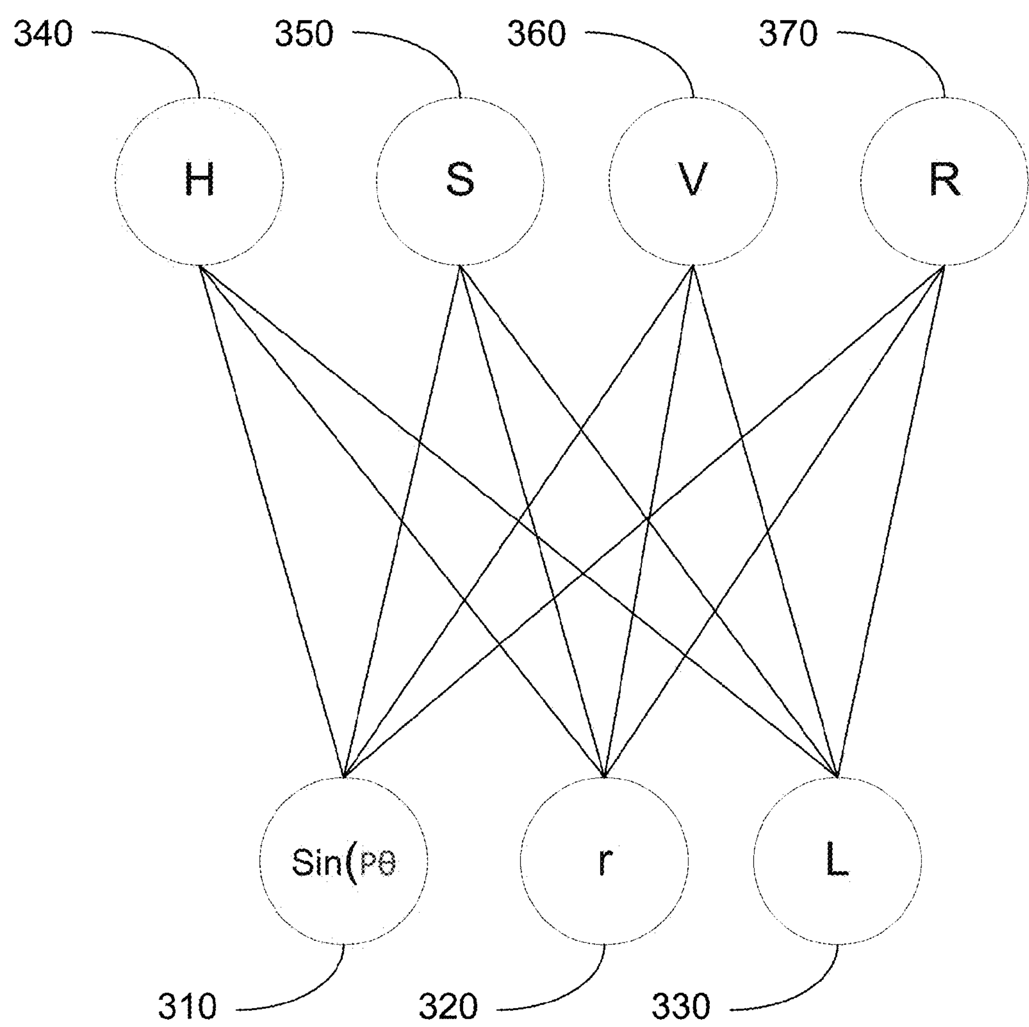
FIG. 3 is a block diagram illustrating inputs and outputs of a flower CPPN from FIG. 1, according to some embodiments disclosed herein.

FIG. 3 is a block diagram of inputs and outputs of a flower CPPN 130 (FIG. 1), according to some embodiments disclosed herein. The figure below shows an example CPPN structure. In this embodiment, the flower CPPN 130 takes input parameters {sin(Pθ), r, L} (310,320, 330). The parameter L (330) corresponds to the layer of the flower (discussed in more detail below.) The pair {sin(Pθ), r} (310, 320) corresponds to polar coordinates, and specifically, to a repeated series of polar coordinates. In this embodiment, angular coordinate {θ} of the polar coordinate is transformed by a periodic function before being supplied to the flower CPPN 130. In other embodiments, the flower CPPN 130 receives plain polar coordinates {θ, r} and the transformed is performed by the flower CPPN 130.

The flower CPPN 130 generates pixel output values from the input parameters. In this embodiment, the pixel output values are a triplet (340, 350, 360) expressed in the HSV color space. However, other color spaces such as RGB can be used, or gray-scale pixels can be used. As noted above, the system 100 provides these pixel outputs to the output device 120, thus generating an image having a radially repetitive arrangement of petals.

The embodiment shown in FIG. 3 also generates a radius deformation value R (370). In such embodiments, the output of the flower CPPN 130 represents a perimeter shape instead of (or in addition to) an image. The flower structures are represented as deformations of a circle, i.e., the radius R of the shape is a function of angle. In effect the output R allows the designer of the flower CPPN 130 and/or the user of the system 100 to define the perimeter of a flower, which creates the outline that defines the petals. The other outputs of the flower CPPN 130 determine the color of pixels within that perimeter, while the perimeter itself is determined by R.

This radius deformation R further biases the shape to be more flower-like, and also provides connectedness. Since the generated shapes are connected, the shapes can be "printed out" physically in three-dimensions using, for example, rapid prototype technologies such as selective laser sintering (SLS), fused deposition modeling, and three dimensional inkjet printing. Though the embodiment shown in FIG. 3 generates a radius deformation value, other embodiments do not.

The following is an example algorithm for generating a flower image using the CPPN encoding described above.

for layer=1 to numLayers $$L=1/\text{layer}$$

for θ=−pi to pi $$R=\text{CPPN}(\sin(P\theta),0,L)\cdot R$$

for r=0 to R $$\text{color}[\theta,r,L]=\text{CPPN}(\sin(P\theta),r,L)\cdot H,S,V$$

The step sizes of the θ and r loops can take any value, with smaller values creating finer images. In this example algorithm, the input angle parameter θ is normalized between −1 and 1 before being input into the flower CPPN 130.

Figure 4:
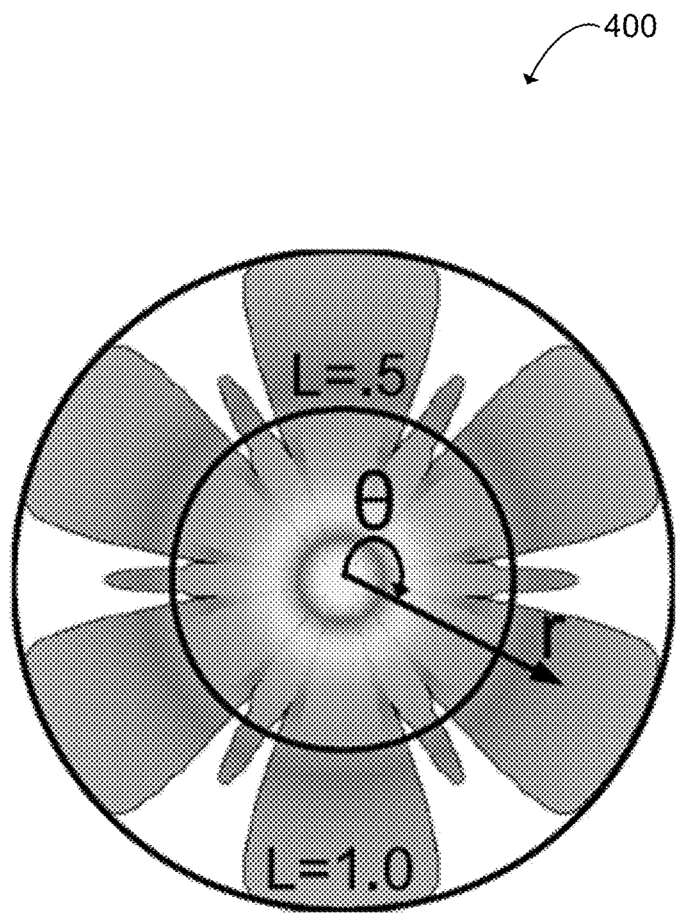
FIG. 4 is a diagram illustrating operation of an algorithm implemented by an image generation module from FIG. 1, according to some embodiments disclosed herein.

FIG. 4 illustrates operation of such an algorithm to produce a flower image 400, according to some embodiments disclosed herein. As can be seen in FIG. 4, for each angle in a circle (θ) (given in radians), the image generation module 110 obtains, by querying the flower CPPN 130, the maximum radius (R) at that angle. The image generation module 110 then obtains, by querying flower CPPN 130, a color value for every polar coordinate (r,θ) on that angle up to the maximum radius.

This process is repeated for each layer (L) from the largest layer down, with each layer drawn scaled down by a factor of L. The L value changes by 1/(number of desired layers) on each iteration, ending at 1/(number of desired layers). Thus, the example in FIG. 4 shows the image 400 produced using two layers, where L takes the values 1 and 0.5. As another example, with three layers, then L will be take on the values 1, 0.66, and 0.33. In some embodiments, L is allowed to vary between other values, for example, from −1 to 1, or from 0 to 1.

The layer input L allows for different structures and variations within the flower. The layer acts as an additional coordinate into the CPPN, and the image generation module 110 queries the entire flower area for each layer. Each new layer is output at a reduced size on top of the old layers. For two-dimensional images, the area is overwritten, but for three-dimensional objects each layer lies physically on top of the others. As noted above, when the image generation module 110 is combined with an output device 120 that utilizes additive manufacturing techniques (e.g., 3D printing), the system 100 produces 3D objects.

Figure 5:
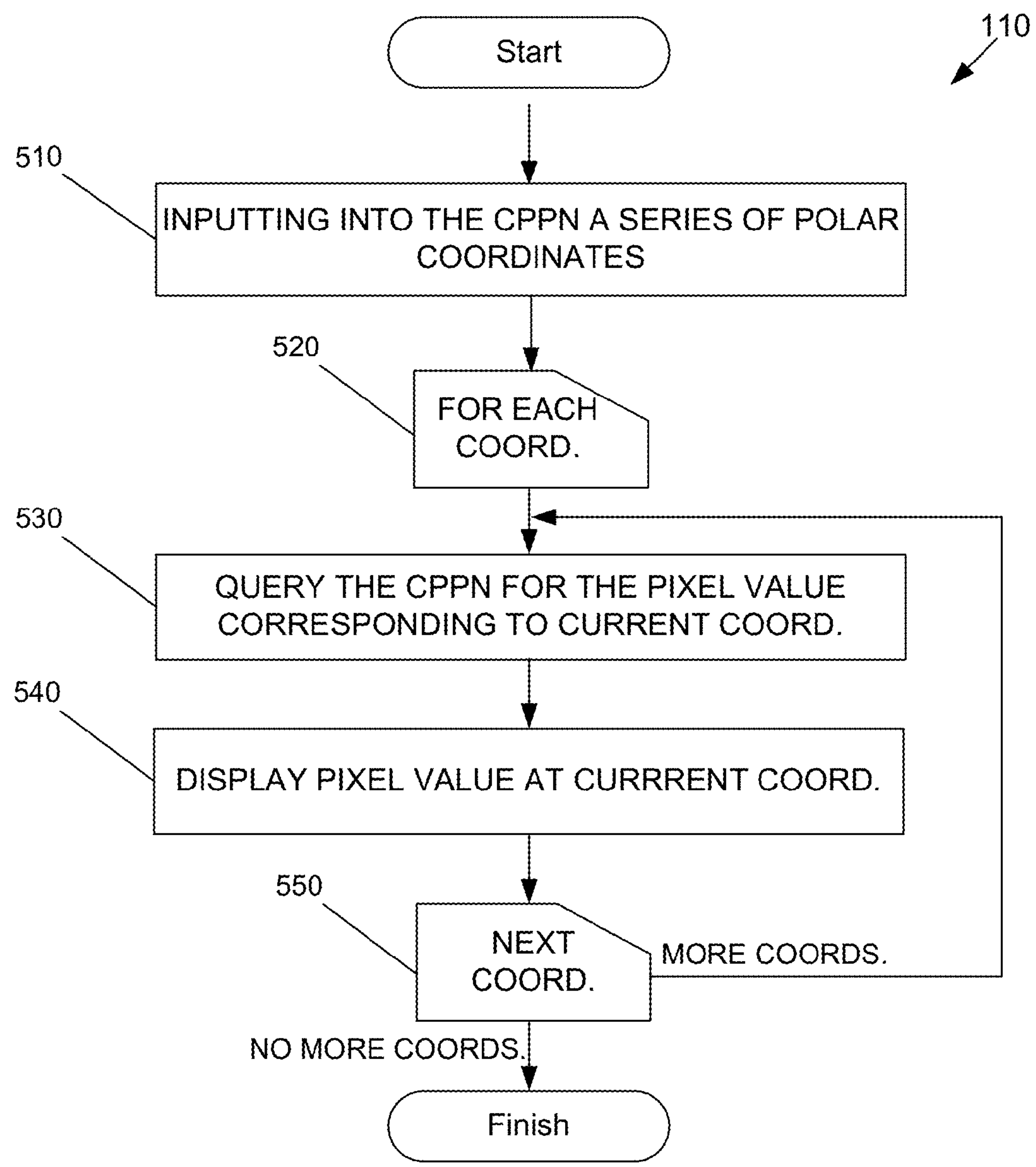
FIG. 5 is a flowchart illustrating operation of acquisition indication logic residing within a communication device as shown in FIG. 1, according to some embodiments disclosed herein.

FIG. 5 is a flowchart illustrating the operation of the image generation module 110 (FIG. 1) according to some embodiments disclosed herein. Alternatively, the flowchart of FIG. 5 may be viewed as implementing various steps of a method performed by the image generation module 110.

Starting at box 510, the image generation module 110 provides the flower CPPN 130 with a series of polar coordinates {r,θ}. Next, at box 520, the image generation module 110 begins a loop which iterates through each of the polar coordinates. Each iteration operates on a current coordinate in the series and the loop exits when all of the coordinates have been processed.

At box 530, the image generation module 110 queries the flower CPPN 130 for the pixel value that corresponds to the current coordinate. As noted above, the image is encoded by the flower CPPN 130 such that providing a coordinate input to the flower CPPN 130 produces a corresponding pixel value. The iteration loop then "reads out" the pixel values from the flower CPPN 130.

Having received a pixel value from the flower CPPN 130, at box 540 the image generation module 110 displays the retrieved pixel value on the output device 120 at the current coordinate. Some embodiments of the image generation module 110 first translate the current polar coordinate to a Cartesian coordinate, while others rely on a display module or display driver associated with the output device 120 to perform this coordinate translation. The pixel values can be gray-scale or color. Various color scheme such as red-green-blue (RGB) or hue-saturation-value (HSV) may be used.

Processing then continues at box 550. If more coordinates remain to be processed, the image generation module 110 moves to the next coordinate in the series and repeats the iteration loop starting at box 520. When all coordinates have been handled, the entire image encoded by the flower CPPN 130 has been displayed, and the process of FIG. 5 is then complete.

The system 100 above was described in terms of a single flower CPPN 130. However, the system 100 can instantiate or store multiple flower CPPNs 130, as should be appreciated. In some embodiments, the encodings stored in flower CPPNs 130 are combined with user interactive evolution, allowing a user to explore parameters that are particularly interesting with respect to flowers, for example, the number of repetitions or layers. Through such interactive platforms, a user can interactively evolve flowers images that share important features with their natural counterparts like symmetry, repetition, and repetition with variation.

In some embodiments, the encodings stored in flower CPPNs 130 are integrated into an online community where users collaborate to create new flowers, for example on a social networking platform (Facebook, Google Plus, etc.). This technology could facilitate an online community where users collaborate to create and share new flower images. Because the underlying encoding can become more complex over time, users can potentially continually discover new, colorful, and more complicated flower images without extending the system.

In some embodiments, the flower encoding CPPNs described herein can be mutated and mated to create new flowers images that bear a resemblance to their parent(s). The mutation and mating may be guided by users in an interactive evolutionary process. Users evolve images by selecting ones that appeal to them, producing a new generation from the selected images. The images may be shared with other users, and users may choose to branch from an existing image and then continue evolving from that image. In some embodiments, the flower-specific CPPNs can be evolved to create new and increasingly complex variations. Techniques such as the NeuroEvolution of Augmenting Topologies (NEAT) algorithm may be used to perform this complexification.

Figure 6:
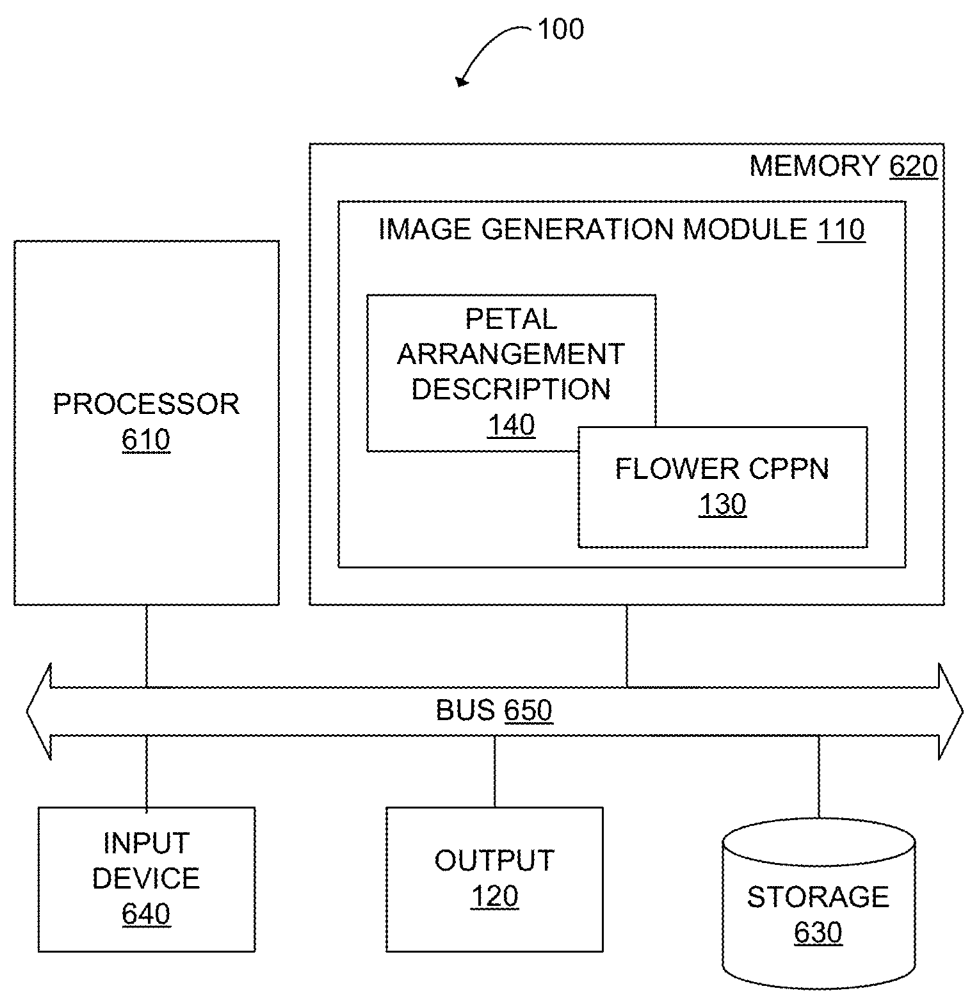
FIG. 6 is a component block diagram of a computer system that generates digital images of structures having a radially repetitive arrangement of petals, according to some embodiments disclosed herein.

FIG. 6 is a block diagram of a computing device that can be used to implement the system 100 according to various embodiments of the present disclosure. The computer contains a number of components that are familiar to a person of ordinary skill in the art, including a processor 610, memory 620, non-volatile storage 630 (e.g., hard disk, flash RAM, flash ROM, EEPROM, etc.), one or more output devices 120 (FIG. 1), and one or more input devices 640. The components are coupled via one or more buses 650. The image generation module 110 and other various components described herein may be implemented in software or in firmware (i.e., code executed by a processor), may be embodied in dedicated hardware, or a combination thereof.

In a software embodiment, instructions are loaded into memory 620 and from there executed by the processor 610. Thus, the processor 610 is configured by these instructions to implement the image generation module 110.

In a dedicated hardware embodiment, the image generation module 110 may be implemented as a circuit or state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or any other hardware device having logic gates for implementing various logic functions upon an application of one or more data signals. Such technologies are generally well known by those skilled in the art and, consequently, are not described in detail herein.

The input devices 640 can include, but are not limited to: keyboard, mouse, touch pad, touch screen, motion-sensitive input device, gesture-sensitive input device, inertial input device, gyroscopic input device, joystick, game controller, etc. The output devices 120 can include, but are not limited to a display, a printer, a three-dimensional printer, a rapid prototyping machine, etc. Omitted from the above figure are a number of conventional components, known to those skilled in the art, which are not necessary to explain the operation of the computer.

Any logic or application described herein (including the image generation module 110) that comprises software or code can be embodied in any non-transitory computer-readable medium for use by or in connection with an instruction execution system such as, for example, processor 610. In this sense, the logic may comprise, for example, statements including instructions and declarations that can be fetched from the computer-readable medium and executed by processor 610. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The diagrams herein show the functionality and operation of an implementation of portions of the image generation module 110. If embodied in software, each block in these diagrams may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 610 in a computer system or other system. The machine code may be converted from the source code, etc. If embodied in hardware, each block may represent a circuit or a number of interconnected circuits to implement the specified logical function(s).

Although the flowchart(s)) herein show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown in a flowchart may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. It is understood that the diagram of FIG. 6 merely provide an example of the many different types of functional arrangements that may be employed to implement the operation of portion(s) of the image generation module 110 as described herein. As an alternative, the flowcharts may be viewed as depicting an example of steps of a method implemented by the image generation module 110 according to one or more embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:

encoding an image in a Compositional Pattern Producing Network (CPPN), the CPPN including a plurality of connected nodes, the CPPN receiving as an input a series of polar coordinates $\{r,\theta\}$ and producing as an output a series of pixel values;

querying the CPPN for one of the pixel values at each of the polar coordinates; and displaying the series of pixel values at the corresponding polar coordinates to produce the image.

2. The method of claim 1, wherein the pixel values are expressed as gray scale values.

3. The method of claim 1, wherein the pixel values are expressed as color values in a color space.

4. The method of claim 3, wherein the color space is defined by hue, saturation, and value (HSV).

5. The method of claim 3, wherein the color space is defined by red, green, and blue (RGB).

6. The method of claim 1, wherein the image is a three-dimensional image.

7. The method of claim 1, wherein the CPPN also receives a layer input L, and wherein the querying further comprises querying the CPPN at a plurality of layers 1 to L.

8. The method of claim 7, wherein the image is a two-dimensional image.

9. A method of generating an image from a Compositional Pattern Producing Network (CPPN), the CPPN comprising a plurality of nodes connected in a graph, each of the nodes associated with an activation function, the method comprising:

receiving, in the CPPN, a series of polar coordinates $\{r,\theta\}$;

outputting, by the CPPN, a series of pixel values, each of the pixel values corresponding to one of the polar coordinates; and displaying the pixel values at the corresponding polar coordinates to produce the image.

10. The method of claim 9, wherein the pixel values are expressed as gray scale values.

11. The method of claim 9, wherein the pixel values are expressed as color values in a color space.

12. The method of claim 9, wherein the displaying comprises translating the corresponding polar coordinates into cartesian coordinates.

13. The method of claim 9, further comprising translating the corresponding polar coordinates into cartesian coordinates, and wherein the pixel values are displayed at the cartesian coordinates.

14. A method of generating an image from a Compositional Pattern Producing Network (CPPN), the CPPN comprising a plurality of nodes connected in a graph, each of the nodes associated with an activation function, the method comprising:

receiving, in the CPPN, a series of polar coordinates, each of the polar coordinates including a radius coordinate r and an angular coordinate $\theta$; and applying a periodic transform P to each of the angular coordinates $\theta$ to produce a transformed polar coordinate;

outputting, by the CPPN, a series of pixel values, each of the pixel values corresponding to one of the transformed polar coordinates; and displaying the pixel values at the corresponding transformed polar coordinates to produce the image.

15. The method of claim 14, wherein the pixel values are expressed as gray scale values.

16. The method of claim 14, wherein the pixel values are expressed as color values in a color space.

17. The method of claim 14, wherein the periodic transform P is a trigonometric function.

18. The method of claim 14, wherein the periodic transform P is a sine function.

19. A method comprising:

encoding an image in a Compositional Pattern Producing Network (CPPN), the CPPN including a plurality of connected nodes, the CPPN receiving as input a parameter L and a series of polar coordinates and producing as output a series of pixel values, L representing a number of layers;

for a first one of the layers, querying the CPPN for one of the pixel values at each of the polar coordinates and for a first value of L, and displaying the pixel values at the corresponding polar coordinates to produce the image; and for the remaining ones of the layers, querying the CPPN for one of the pixel values at each of the polar coordinates and for successive values of L, and displaying the pixel values at a scaled version of each the corresponding coordinates to produce the image.

20. The method of claim 19, wherein the image is a two-dimensional image.

* * * * *